(12) United States Patent
Abelyan et al.

(10) Patent No.: US 8,318,232 B2
(45) Date of Patent: Nov. 27, 2012

(54) SWEETNER AND USE

(75) Inventors: Varuzhan Abelyan, Kuala Lumpur (MY); Avetik Markosyan, Kuala Lumpur (MY); Lidia Abelyan, Kuala Lumpur (MY)

(73) Assignee: PureCircle Sdn Bhd, Negeri Sembilan (MY)

( * ) Notice: Subject to any disclaimer, the term of this patent is extended or adjusted under 35 U.S.C. 154(b) by 315 days.

(21) Appl. No.: 12/684,129

(22) Filed: Jan. 8, 2010

(65) Prior Publication Data

US 2010/0189861 A1 Jul. 29, 2010

Related U.S. Application Data

(63) Continuation-in-part of application No. 11/246,066, filed on Oct. 11, 2005, now Pat. No. 7,807,206.

(51) Int. Cl.
*A23L 1/236* (2006.01)

(52) U.S. Cl. .......................................... 426/548; 426/48

(58) Field of Classification Search ................... 426/18, 426/48, 478, 548, 661
See application file for complete search history.

(56) References Cited

U.S. PATENT DOCUMENTS

| | | | |
|---|---|---|---|
| 4,082,858 A | 4/1978 | Morita et al. | |
| 4,219,571 A | 8/1980 | Miyake | |
| 4,361,697 A | 11/1982 | Dobberstein et al. | |
| 4,892,938 A | 1/1990 | Giovanetto | |
| 5,962,678 A | 10/1999 | Payzant et al. | |
| 5,972,120 A | 10/1999 | Kutowy et al. | |

OTHER PUBLICATIONS

Chang, Stephen S.; Cook, J.M. Stability studies of stevioside and rebaudioside A in carbonated beverages. Materials and Methods, pp. 1-6.

T. R. Grenby, ed. Developments in sweeteners—3. Elsevier Applied Science, pp. 1-43.

Tanaka, O. 1997. Improvement of taste of natural sweeteners. Pure Appl. Chem. 69: 675-683.

Lobov, S. V., Kasai, R., Ohtani, K., Tanaka, O., & Yamasaki, K. (1991). Enzymic production of sweet stevioside derivatives: transglucosylation by glucosidases. Agric Biol Chem 55(12), 2959-2965.

Kitahata, S., Ishikawa, H., Miyata, T., & Tanaka, O. (1989). Production of rubusoside derivatives by transgalactosylation of various β-galactosidases. Agric Biol Chem 53 (11), 2923-2928.

Yamamoto, K., Yoshikawa, K., & Okada, S. (1994). Effective production of glycosylsteviosides by α-1,6 transglucosylation of dextrin dextranase. Biosci Biotechnol Biochem 58(9), 1657-1661.

*Primary Examiner* — Leslie Wong
(74) *Attorney, Agent, or Firm* — Pyprus Pte Ltd

(57) ABSTRACT

Sweeteners on the basis of a simultaneously transglucosylated sweet glycoside mixture of *Stevia rebaudiana* Bertoni are prepared. The transglucosylation was developed in the presence of starch under the action of cyclodextrin glucanotransferase. The remaining maltodextrins are transformed to the fructose-terminated oligosaccharides by the addition of sucrose. The sweeteners are purified to not less than 98% content of sweet glycosides and derivatives. The preparations are almost non-caloric, non-cariogenic, non-bitter, non-lingering sweeteners, which may be advantageously applied in foods, beverages, cosmetics and milk products.

6 Claims, 3 Drawing Sheets

SWEETNER AND USE

RELATED APPLICATIONS

This application is a continuation-in-part application of U.S. patent application Ser. No. 11/246,066, filed Oct. 11, 2005 now U.S. Pat. No. 7,807,206.

BACKGROUND OF THE INVENTION

1. Field of the Invention

The invention relates to a process for producing a highly purified sweetener from the extract of the *Stevia rebaudiana* Bertoni plant and its use in various food products and beverages.

2. Description of the Related Art

At present, artificial sweeteners such as dulcin, sodium cyclamate and saccharin have been banned or restricted in view of food sanitation, and harmless natural sweeteners are receiving ever-increasing demand. The sweet herb *Stevia rebaudiana* Bertoni, produces an alternative sweetener with the added advantage that *Stevia* sweeteners are natural plant products. In addition, the sweet steviol glycosides have functional and sensory properties superior to those of many high potency sweeteners.

The extract of *Stevia rebaudiana* plant contains a mixture of different sweet diterpene glycosides, which have a single base—steviol and differ by the presence of carbohydrate residues at positions C13 and C19. These glycosides accumulate in *Stevia* leaves and compose approximately 10%-20% of the total dry weight. Typically, on a dry weight basis, the four major glycosides found in the leaves of *Stevia* are Dulcoside A (0.3%), Rebaudioside C (0.6%), Rebaudioside A (3.8%) and Stevioside (9.1%). Other glycosides identified in *Stevia* extract include Rebaudioside B, C, D, E, and F, Steviolbioside and Rubusoside.

Of the four major diterpene glycoside sweeteners present in *Stevia* leaves only two, stevioside and rebaudioside A, have had their physical and sensory properties well characterized. Stevioside and rebaudioside A were tested for stability in carbonated beverages and found to be both heat and pH stable (Chang and Cook, 1983). Stevioside is between 110 and 270 times sweeter than sucrose, rebaudioside A between 150 and 320 times sweeter than sucrose, and rebaudioside C between 40 and 60 times sweeter than sucrose. Dulcoside A was 30 times sweeter than sucrose. Rebaudioside A was the least astringent, the least bitter, had the least persistent aftertaste and was judged to have the most favorable sensory attributes of the four major steviol glycosides (Phillips, 1989 and Tanaka, 1997).

Methods for the recovery of diterpene glycosides from the *Stevia rebaudiana* plant using water or large amounts of organic solvents, such as methanol and ethanol are described in U.S. Pat. No. 4,361,697, U.S. Pat. No. 4,082,858, U.S. Pat. No. 4,892,938, U.S. Pat. No. 5,972,120, and U.S. Pat. No. 5,962,678.

However, steviol glycosides even in highly purified form possess residual bitterness and aftertaste, which affect its qualitative characteristics. They can be eliminated by the reaction of intermolecular transglycosylation of various enzymes, upon which the attachment of new carbohydrates at positions C13 and C19 takes place. It is the number of carbohydrate units in the above-mentioned positions that determines the quality and degree of the component's sweetness.

Pullulanase, isomaltase (Lobov et al., 1991), β-galactosidase (Kitahate et al., 1989), and dextran saccharase (Yamamoto et al., 1994) are used as transglycosylating enzymes, with pullulan, maltose, lactose, and partially hydrolyzed starch, respectively, being donors.

The treatment with pullulanase results in production of 13-O-[β-maltotriosyl-(1,2)-β-D-glucosyl]-19-O-β-glucosyl-steviol; 13-O-[β-maltosyl-(1,2)-β-glucosyl]-19-O-β-D-glucosyl-steviol and 13-O-[β-sephorosyl-19-O-β-maltotriosyl-steviol. Although the yields of the transglycosylated products were rather low, the selectivity in terms of the yield of the desirable mono- and di-derivatives was higher than in the case of CGTase (Lobov et al., 1991).

In case of maltase, three transglycosylated products are also produced, namely 13-O-[β-sephorosyl-19-O-β-isomaltosyl-steviol; 13-O-[β-isomaltosyl-(1,2)-β-D-glucosyl]-19-O-β-D-glucosyl-steviol and 13-O-[β-nigerosyl-(1,2)-β-D-glucosyl]-19-β-D-glucosyl-steviol.

The transglucosylation of stevioside was also done by action of cyclodextrin glucanotransferases (CGTase) produced by *Bacillus stearothermophilus* FERM-P No 2222 (U.S. Pat. No. 4,219,571).

However, all the abovementioned processes are based on the modification either of stevioside or rebaudioside A, which have to be isolated or enriched before such treatment. The sweetness level of the products obtained ranges between 50-120, and the final products contains about 20% of maltooligosacharides that decrease the healthy properties of the product. Besides that, the reactions conditions were not defined clearly (U.S. Pat. No. 4,219,571). For example, the concentration range of stevioside (from 0.1% to 20%) and enzyme (CGTase) (from 1% to 50%), and also the limits of temperature (from 20° C. to 80° C.), pH (from 3 to 10), and transformation duration (from 5 to 80 hours) are too large. Thus, it is impossible to define the preferred embodiment.

On the other hand, defining the optimum reaction condition can considerably decrease the reaction time and consumption of enzyme, and also increase the yield of the final product. It can maximize the economic contribution of the industrial process. Besides, the filtration rate of the reaction mixture, obtained at low temperatures, after treatment by activated carbon is very low, which can be incommensurably improved by increasing the reaction temperature. It also helps to decrease the non-modified amounts of glycosides.

Accordingly, it is desirable to provide a process for the simultaneous enzymatic modification of glycosides, existing in the commercial extract of *Stevia rebaudiana* Bertoni plant, for manufacturing a purified sweetener with high sweetness, and for use thereof in various beverages and food products. Also the conversion of remaining maltooligosaccharides into fructose-terminated oligosaccharides increases the healthy proposition and taste profile of the product.

SUMMARY OF THE INVENTION

An object of the invention is to overcome the disadvantages associated with sweeteners of the related art. The present invention relates to a process for producing a highly purified sweetener from the extract of the *Stevia rebaudiana* Bertoni plant and use thereof in various food products and beverages.

The invention, in part, pertains to a sweetener formed of glucosylated derivatives of *Stevia rebaudiana* Bertoni. The glucosylated derivatives are at least one selected from the group consisting of stevioside, rebaudioside A, rebaudioside C, and dulcoside A. The glucosylated derivatives can be enzymatically transglucosylated derivatives developed with CGTases produced by cultures of *Bacillus stearothermophilus*. The sweetener can be at least 98% pure.

The invention, in part, pertains to a process for producing a sweetener containing glucosylated stevioside, rebaudioside A, rebaudioside C, or dulcoside A. The process can be an enzymatic transglucosylating process using CGTases produced by cultures of *Bacillus stearothermophilus*. The process can have the step of converting the remaining maltooligosaccharides into fructose-terminated oligosaccharides. The process can also have the steps of decolorizing, desalting and removing malto- or fructose-terminated oligosaccharides. The decolorizing can be performed using activated carbon. The desalting can be performed by passing through ion exchange resin. Removing the malto- or fructose-terminated oligosaccharides can be performed by passing through ion exchange resin.

In the invention, *Stevia* extract commercialized by "Ganzhou Julong High-Tech Food Industry Co., Ltd (China), containing stevioside (38-40%), rebaudioside A (41-42%), rebaudioside C (7-8%), and dulcoside (1-1.5%), with total content of 90%, was treated by calcium hydroxide, and $FeCl_3$, the precipitate was removed by filtration and the filtrate was deionized and decolorized by Amberlite FPC23H, Amberlite FPA51, and Amberlite FPA98Cl. The clear solution was passed through polysulfone based ultrafiltration membranes with a filtering discrimination of 2.5 kDa (Liumar Technologies, Ottawa, Canada) with diafiltration.

The resulting purified extract with total content of glycosides more than 98% was concentrated and subjected to the enzymatic transglucosylation under the action of cyclodextrin glycosyltransferase (CGTase) in the presence of starch to perform the transglycosylation of steviol glycosides, and then in the presence of sucrose to convert remaining maltooligosaccharides into the fructose-terminated oligosaccharides.

The obtained reaction mixture was decolorized, deionized, concentrated and spray dried. In order to manufacture the mixture with high content of transglucosylated glycosides, the oligosaccharides are removed on Amberlite XAD16 HP resin or Dowex 50W-X4 in $Ca^{2+}$ form, and sweet glycosides are powdered by spray drying.

The total sweeteners obtained were applied in various foods and beverages as a sweetener, including ice cream, cookies, bread, fruit juices, milk products, baked goods and confectionary products. The sweetener can also be used in making tablets for pharmaceuticals, vitamins, nutritional supplements, etc.

It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention. The drawings illustrate embodiments of the invention and together with the description serve to explain the principles of the embodiments of the invention.

DETAILED DESCRIPTION OF THE INVENTION

Advantages of the present invention will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Commercialized *Stevia* extract (Ganzhou Julong High-Tech Food Industry Co., Ltd, China), containing stevioside (38-40%), rebaudioside A (41-42%), rebaudioside C (7-8%), and dulcoside (1-1.5%), with total content of 90%, was dissolved in distilled water to prepare a 5-10%, more preferably 7-8% solution. Then, the pH was adjusted to 9.5-10.0 by calcium hydroxide or any other suitable basic material such as calcium carbonate. After mixing at 45-50° C. for 20-30 min, the solution was cooled to ambient temperature and was neutralized by $FeCl_3$.

After mixing for 20-30 min the precipitate was removed by filtration and the filtrate was deionized and decolorized by Amberlite FPC23H, Amberlite FPA51, and Amberlite FPA98Cl in a conventional manner. The clear solution was passed through polysulfone-based ultrafiltration membranes with a filtering discrimination of 2.5 kDa (Liumar Technologies, Ottawa, Canada) with diafiltration, concentrated under vacuum and spray dried. However, the invention is not restricted to polysulfone membranes, and any suitable type of membrane can be used.

Any type of existing *Stevia* extract with various ratios of sweet glycosides can be used.

Figure 1:
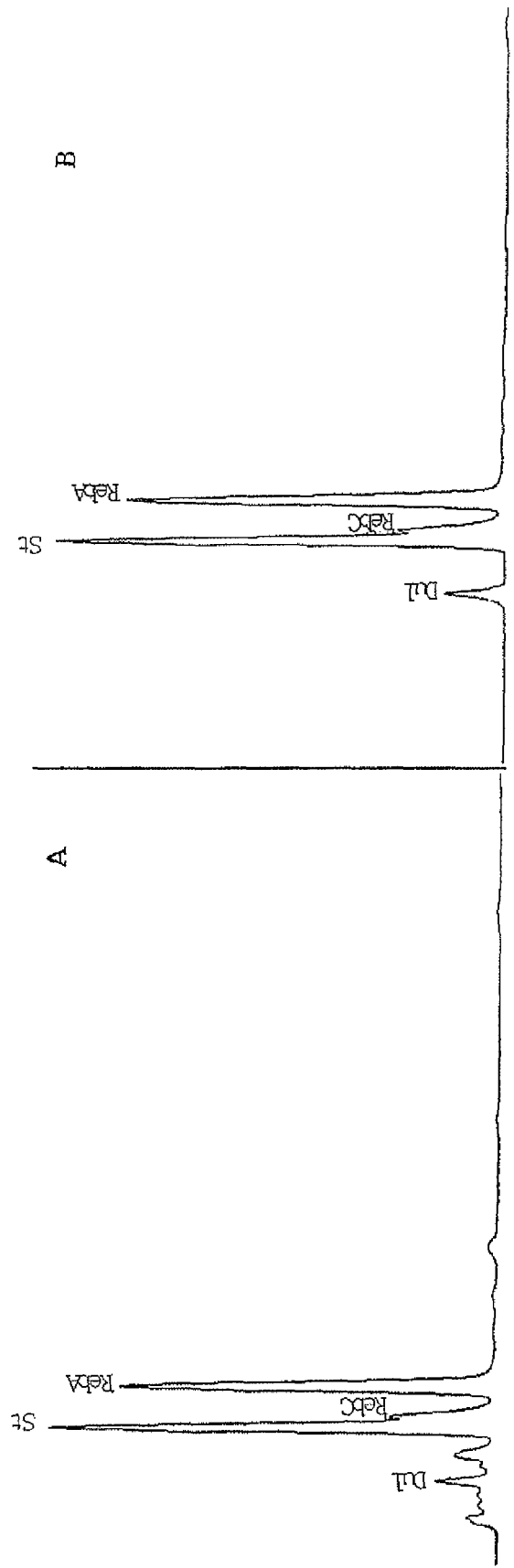
FIG. 1 shows a high-performance liquid chromatographic (HPLC) chart of commercial (A) and purified (B) extracts.

A white powder with content of stevioside, rebaudioside A, rebaudioside C, and dulcoside more than 98% was obtained (FIG. 1).

The HPLC analysis of the obtained product was performed using an Agilent Technologies 1100 Series (USA) equipped with a Zorbax-$NH_2$ column using an acetonitrile-water gradient from 80:20, v/v (2 minutes) to 50:50, v/v during 70 minutes and UV detector at 210 nm.

The enzymatic transglucosylation of sweeteners obtained was developed with CGTases produced by *Bacillus stearothermophilus* VRPM B-4905 (Russian National Collection of Industrial Microorganisms). In this step, any CGTase possessing a intermolecular transglucosylation activity can by applied.

The cultivation of *B. stearothermophilus* was conducted under aerobic conditions at 56° C. at a pH range of 5-8, preferably 6.8-7.2. The cultivation time was 20-22 hours. The aeration rate was adjusted in the range of 0.5:1.0 v/v per one minute, preferably, 1:1 v/v.

The cultivation can be carried out in a batch or continuous conditions.

Any synthetic and natural nutrient culture media can be used for the cultivation of the microorganisms. Any carbon-containing substances can be used in the invention as carbon sources. For instance, saccharides such as sucrose, maltose, dextrin, glucose, lactose, galactose, cyclodextrins, and starch, as well as saccharide-containing products such as molasses and yeast extracts, can be used as the carbon sources. The concentrations of these carbon sources in nutrient culture media are selectively chosen depending on their types.

However, the best results are obtained in the case of 0.5-2.0% of starch, preferably, 0.7-0.9%. The nitrogen sources usable in the invention are, for example, inorganic nitrogen-containing compounds such as ammonium salts; and organic nitrogen-containing compounds such as urea, corn steep liquor, casein, peptone, yeast extract, and beef extract. The inorganic ingredients usable in the present invention are, for example, calcium salts, magnesium salts, potassium salts, sodium salts, phosphates and others.

Since the CGTase activity was found in the cell-free nutrient media, the media can be collected and used as a crude enzyme. Conventional liquid-solid separation methods can be used to remove cells. For example, methods to directly centrifuge the culture and those to filtrate with pre-coat filters or to separate cells by membrane filtration using plain filters or hollow-fibers. The resulting cell-free culture broth can be used intact as a crude enzyme, and preferably, used after concentration. The concentration methods usable in the present invention are, for example, salting out using ammonium sulfate, sedimentation using acetone and/or alcohol, and concentration using ultrafiltration membranes such as plain filters and hollow-fibers. However, any suitable collection and concentration methods can be used.

Crude enzymes can be immobilized by conventional methods such as adsorption, covalent biding, and entrapping.

Crude enzymes can be used intact or after purification. For example, cell-free culture broth was concentrated using ultrafiltration membranes, and purified successively on beta-cyclodextrin polymers to obtain an enzyme preparation exhibiting an electrophoretically single protein band.

The activity of CGTases according to the invention was determined by the following assay: The mixture of 10 μl enzyme and 0.2% amylose solution in 0.2M buffer was incubated at 50° C. for 10 min. The reaction was stopped by adding 1 ml 0.5M acetic acid and 0.5 ml 0.02% $I_2$/0.2% KI solution. The mixture volume was brought up to 10 ml with distilled water, and extinction was determined under 700 nm. The enzyme activity unit was accepted as the enzyme quantity that has reduced the intensity of blue color by 10% for 1 min.

Starches of various origins, for example, from wheat, corn, potato, tapioca, and sago can be used as donors for glucosyl units.

The dextrose equivalent of the partially hydrolyzed starch can be in the range of 10-25, preferably 12-16.

The amount of enzyme to be used for liquefaction of starch was within the limits of 1-5 units/gram of starch, preferably 2-3 units. In the stage of transglucosylation the quantity of enzyme was 7-15 units/gram of starch, preferably 8-11 units. However, the larger amount of enzyme raises the yield of transglucosylated products and shortens the duration of enzymatic reaction.

The process temperature was 65-75° C., preferably 68-72° C. Increasing the reaction temperature increases the reaction rate. Low temperatures are not favorable.

After about 12-13 hours of reaction between glycosides and starch, the remaining maltooligosaccharides are transformed into the fructose-terminated oligosaccharides (FTO) by adding to the reaction mixture the sucrose in an amount of 50-100%, preferably 50-70% from the content of maltooligosaccharides. Then, the reaction was continued for another 5-6 hours at the same temperature. The FTOs are less prone to fermentation and acid production by *Streptococcus mutans*, which are usually abundant in oral cavity, in contrast to traditional sugars used in food products, which are digested with forming acids and insoluble glucans and thus give rise to various forms of caries.

The reaction was stopped by heating at 95° C. for 15 minutes to inactivate the enzyme, and the solution was decolorized with a small amount of activated carbon and then desalted by passage through ion exchange resins, such as Amberlite FPC23H (H type) and Amberlite FPA51 (OH type), concentrated and dried. The resulting product (Sample No. 2) contains non-modified glycosides, their glycosylated derivatives and a mixture of fructose-terminated oligosaccharides. Sample No. 1, which along with glycosides, contains about 17-20% of various maltooligosaccharides, was obtained without using sucrose. Other appropriate decolorizing and desalting methods can be used.

Figure 2:
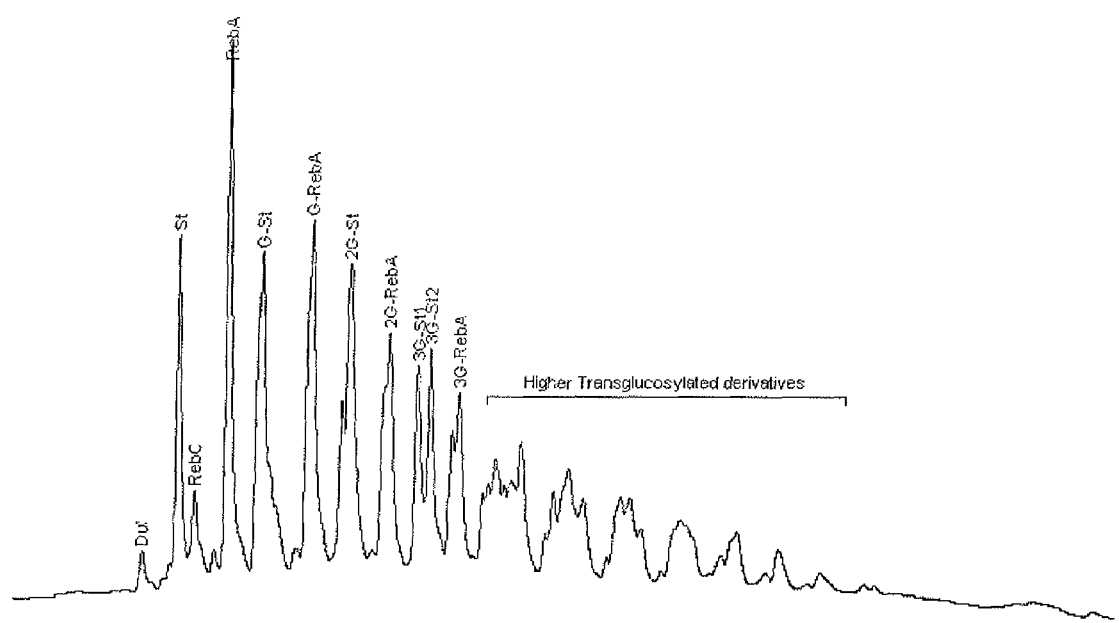
FIG. 2 shows a high-performance liquid chromatographic chromatogram of purified transglucosylated *Stevia* extract.
Figure 3:
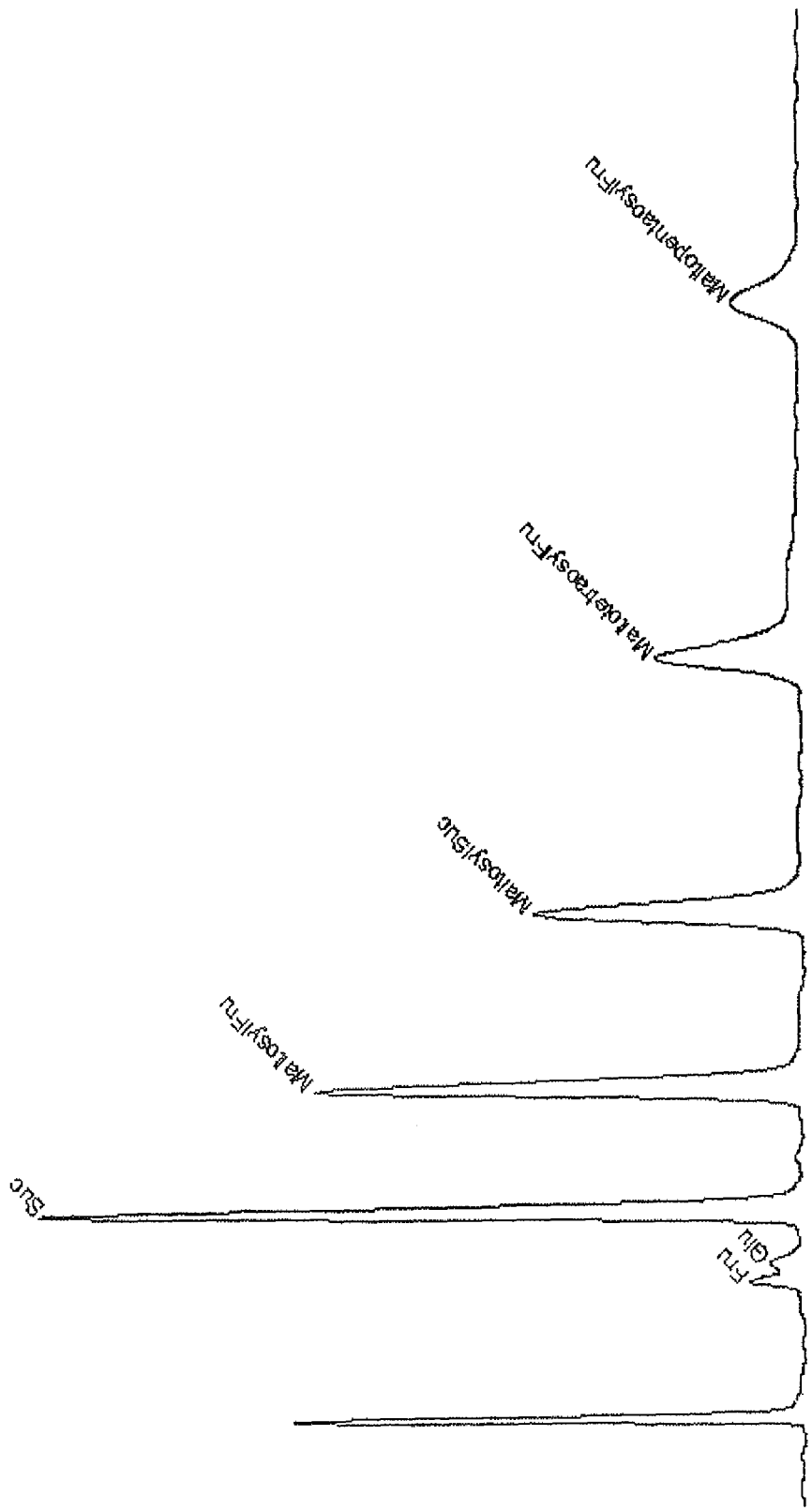
FIG. 3 shows a high-performance liquid chromatographic chromatogram of fructose-terminated oligosaccharides.

In order to prepare a sweetener with higher content of total sweet glycosides only (the sum of glycosylated and non-glycosylated glycosides), the malto- or fructose-terminated oligosaccharides were removed from the reaction mixture using Amberlite XAD16 HP or Dowex 50W-X4 ($Ca^{2+}$), and the solution of glycosides are powdered by spray drying (Sample No. 3 and Sample No. 4, respectively) (FIG. 2). The typical HPLC chart of fructose terminated oligosaccharides is presented in the FIG. 3). The composition of the Samples obtained is summarized in the TABLE 1.

Based on the results of preliminary test on the sweetening power of the sweeteners, an aqueous solutions were prepared that exhibited a sweetness comparable to that of 10% aqueous sucrose solution.

The organoleptic test was carried out at 25° C., with 20 panel members, and, by the panel, the most desirable and most undesirable sweeteners were chosen along with comments on their taste qualities. As the control the usual type of glucosylated stevioside was prepared. The results are shown in TABLE 1.

TABLE 1

| Name | Content, % | | | |
|---|---|---|---|---|
| | Sample 1 | Sample 2 | Sample 3 | Sample 4 |
| Glycosides | | | | |
| Stevioside | 6.2 | 5.6 | 7.2 | 1.1 |
| Rebaudioside α | 7.6 | 6.8 | 8.9 | 5.5 |
| Rebaudioside C | 1.3 | 1.1 | 1.5 | 2.6 |
| Dulcoside A | 0.2 | 0.1 | 0.3 | 0.3 |
| Monoglucosylated-stevioside | 12.8 | 11.5 | 16.0 | 18.6 |
| Diglucosylated-stevioside | 12.1 | 10.9 | 14.1 | 15.2 |
| Triglucosylated-stevioside | 6.4 | 5.8 | 7.5 | 7.7 |
| Tetraglucosylated-stevioside | 3.3 | 2.9 | 3.8 | 4.1 |
| Monoglucosylated-Rebaudioside A | 11.5 | 10.4 | 14.4 | 15.5 |
| Diglucosylated-Rebaudioside A | 10.2 | 9.3 | 12.9 | 14.8 |
| Triglucosylated-Rebaudioside A | 4.5 | 4.3 | 5.2 | 5.6 |
| Tetraglucosylated-Rebaudioside A | 2.8 | 2.5 | 3.2 | 3.7 |
| Other transfer products | 3.1 | 2.8 | 3.6 | 3.8 |
| Total content of glycosides | 82 | 74 | 98.6 | 98.5 |

TABLE 1-continued

| Name | Sample 1 | Sample 2 | Sample 3 | Sample 4 |
|---|---|---|---|---|
| Content, % | | | | |
| Carbohydrates | | | | |
| Glucose | 1.3 | 1.1 | 0.1 | 0.1 |
| Fructose | — | 0.6 | — | — |
| Sucrose | — | 2.4 | — | — |
| Maltose | 4.6 | 1.4 | 0.5 | 0.5 |
| Glucosylsucrose | — | 7.2 | — | — |
| Maltotriose | 4.9 | 1.6 | 0.6 | 0.6 |
| Maltosylsucrose | — | 7.0 | — | — |
| Alpha-cyclodextrin | 1.1 | — | — | — |
| Beta-cyclodextrin | 1.3 | — | — | — |
| Gamma-cyclodextrin | — | — | — | — |
| Higher oligosaccharides | 4.8 | 4.7 | 1.2 | 1.3 |
| Total content of carbohydrates | 18 | 26 | 1.4 | 1.5 |
| Relative sweetness to 5% of sucrose | 160-170 | 170-180 | 220-230 | 210-220 |

As apparent from the results in TABLE 2, sweetness quality of the Samples No. 2, No. 3, and No. 4 was rated as most superior. The further purified sweetener, with low content of intact stevioside (Sample No. 4), was observed as being slightly superior to Samples No. 2 and No. 3.

The sweeteners can be used for seasoning of various food products (for example, soy sauce, soy sauce powder, soy paste, soy paste powder, dressings, mayonnaise, vinegar, powder vinegar, bakery products and confectioneries, frozen-desserts, meat products, fish-meat products, potato salad; bottled and canned foods, fruits and vegetables) in intact or mixed forms with other sweeteners, such as corn syrup, glucose, maltose, sucrose, lactose, aspartame, saccharin, sugar alcohols, organic and amino acids, flavors and/or coloring agents.

TABLE 2

| Judgement | Glucosylated stevioside | Sample 1 | Sample 2 | Sample 3 | Sample 4 |
|---|---|---|---|---|---|
| Most desirable | 0 | 1 | 6 | 6 | 7 |
| Most undesirable | 14 | 6 | 0 | 0 | 0 |
| Organoleptic properties | Sweet, slightly bitter, astringent, no lingering after-taste | Sweet, slightly bitter, astringent, no lingering after-taste | Sweet, light, soft, round, pleasant, similar to sucrose, no lingering after-taste, expression of sweetness is rapid. | Sweet, light, soft, round, pleasant, similar to sucrose, no lingering after-taste, expression of sweetness is rapid. | Sweet, light, soft, round, pleasant, similar to sucrose, no lingering after-taste, expression of sweetness is rapid. |

The products are favorably usable as a low-cariogenic and low-calorie sweetener because it is less fermentable by oral dental-caries causative microorganisms; for example, low-cariogenic food products, such as confectioneries including chewing gum, chocolate, biscuits, cookies, toffee and candy; and soft drinks such as coffee, cocoa, juice, carbonated drinks, sour milk beverage, and yoghurt drinks; alcoholic drinks, such as brandy, whisky, vodka and wine. In addition to the above-described uses, the sweeteners are usable for sweetening drugs and cosmetics.

The following examples illustrate preferred embodiments of the invention.

EXAMPLE 1

Preparation of Cyclodextrin Glycosyltransferase

A strain of *Bacillus stearothermophilus* VKPM B-4905 was inoculated on 10 liters of a sterilized culture medium (pH 7.0-7.2) containing 0.7% (w/v) soluble starch, 0.5% (w/v) corn steep liquor, 0.53% (w/v) ammonium chloride, and 0.2% (w/v) calcium carbonate. The mixture was incubated at a temperature of 56° C. for 20 hours with aeration and stirring. The resultant culture broth was centrifuged, and the supernatant was concentrated up to five times on ultrafiltration membranes. The concentrated solution was diluted with three volumes of distilled water and again concentrated to the initial concentrate volume. The process was repeated for three times. A crude enzyme preparation with an activity of about 90,000 units was obtained.

EXAMPLE 2

Preparation of Sweetener 150 grams of commercialized *Stevia* extract (Ganzhou Julong High-Tech Food Industry Co., Ltd, China), containing stevioside (40%), rebaudioside A (42%), rebaudioside C (7%), and dulcoside A (1%), with total content of 90%, were dissolved in 2000 ml of distilled water. After complete dissolving the pH of the solution was adjusted to 9.5 by about 3 grams of calcium hydroxide and maintained with slow agitation for 30 minutes at 50° C. Then, the suspension was cooled to ambient temperature, neutralized with about 6 grams of $FeCl_3$ and agitation was continued for another 30 minutes.

The precipitate formed was removed by filtration, and the filtrate was deionized and decolorized by Amberlite FPC23H, Amberlite FPA51, and Amberlite FPA98Cl in the conventional manner. The clear solution was passed through polysulfone based ultrafiltration membranes with a filtering discrimination of 2.5 kDa (Liumar Technologies, Ottawa, Canada) with diafiltration, concentrated under vacuum and spray dried. 135 grams of purified extract was obtained with 98.2% of total content of glycosides.

100 grams of tapioca starch was suspended in 600 ml of distilled water (pH 6.5-7.0), 200 units of CGTase obtained in EXAMPLE 1 was added, and the liquefaction of starch was carried out at 75-80° C. for about one hour to dextrose equivalent about 15. After cooling to 70° C., the purified Stevia extract in an amount of 100 grams was added and mixed until a homogeneous solution was obtained. 800 units of CGTase was added to the solution and allowed to incubate at a temperature of 70° C. for 18 hours. At 55° C. and 60° C. the reaction time was 48 hours and 32 hours, respectively. At 75° C. the reaction was completed in 12-13 hours. The obtained reaction mixture was heated at 95° C. for 15 minutes to inactivate the enzyme, decolorized with 0.2% (w/v) of activated carbon, and desalted by passage through ion exchange resins Amberlite FPC23H (H type) and Amberlite FPA51 (OH type). The solution was concentrated at 65° C. under reduced pressure, and dried into a powder form. 196 grams of product were obtained (corresponds to Sample No. 1).

EXAMPLE 3

Preparation of Sweetener

The reaction between purified *Stevia* extract and starch was carried out according to the procedure of EXAMPLE 2. After 12 hours, 20 grams of sucrose were added to reaction mixture and transformation was continued at 70° C. for another 5 hours. The obtained reaction mixture was treated similar to Sample 1. 217 grams of product were obtained (corresponds to Sample No. 2).

EXAMPLE 4

Preparation of Sweetener 10 grams of Sample 2, prepared according to the EXAMPLE 3, were dissolved in the 20 ml of distilled water and at ambient temperature was passed through a column packed with Amberlite XAD16 (5.0×50 cm) with spacial velocity of 0.2 hour$^{-1}$. The column was washed sequentially with water (1000 ml), 20% ethanol (1000 ml), 50% ethanol (1000 ml), and 70% ethanol (1000 ml). The water fraction contained mainly monosaccharides, while 20% ethanol fraction comprised oligosaccharides. In 50% ethanol mainly glycosylated products were detected. Non-modified forms of glycosides with a small amount of glycosylated derivatives were eluted by 70% ethanol.

The 50% and 70% ethanol fractions were combined, concentrated and dried into powder form. 6.2 grams of product were obtained (Sample No. 3).

EXAMPLE 5

Preparation of Sweetener 10 grams of Sample 2, prepared according to EXAMPLE 3, were dissolved in the 20 ml of distilled water and at ambient temperature was passed through the column packed with Dowex 50W-X4 ($Ca^{2+}$) (5.0×50 cm). The elution was performed using distilled water with spacial velocity of 0.3 hour$^{-1}$. The main fractions containing glycosylated derivatives of sweet glycosides were combined, concentrated, and dried into powder form. 5.8 grams of product were obtained (Sample No. 4).

EXAMPLE 6

Chocolate

A composition containing 30 kg of cacao liquor, 11.5 kg of cacao butter, 14 kg of milk powder, 44 kg of sorbitol, 0.1 kg of salt, and 0.1 kg of sweetener, obtained according to the EXAMPLES 2, 3, 4, or 5, was kneaded sufficiently, and the mixture was then placed in a refiner to reduce its particle size for 24 hours. Thereafter, the content was transferred into a conche, 300 grams of lecithin was added, and the composition was kneaded at 50° C. for 48 hours. Then, the content was placed in a shaping apparatus, and solidified.

The products were low-cariogenic and low-calorie chocolate with excellent texture. However, the organoleptic test carried out with 20 panelists, revealed the no lingering aftertaste for the chocolate prepared using sweetener of Sample No. 1. The most desirable one was the product with Sample No. 4 (8 members), Sample No. 2 (7 members), and Sample No. 3 (5 members).

EXAMPLE 7

Ice-Cream 1.50 kg of whole milk were heated to 45° C., and 300 grams of milk cream, 100 grams of tagatose, 90 grams of sorbitol, 6 grams of carrageenan as a stabilizer, 3 grams of polysorbate-80 as an emulsifier, and 1.0 gram of sweetener, obtained according to the EXAMPLES 2, 3, 4, or 5, were added into the milk and was stirred until the ingredients completely dissolved. The mixture then was pasteurized at a temperature of 80° C. for 25 seconds. The homogenization of the obtained mixture was carried out at a pressure of 800 bars and the samples were kept at a temperature of 4° C. for 24 hours to complete the aging process. Vanilla flavor (1.0% of the mixture weight) and coloring (0.025% of the mixture weight) are added into the mixture after the aging process. The mixture was then transferred to ice cream maker to produce ice cream automatically. Samples of ice creams produced were transferred to sealed containers and were kept in the freezer at a temperature of −18° C.

The application of sweeteners does not affect the physicochemical properties of ice cream, as well as the overall attributes of color, smoothness, surface texture, air cell, vanilla aroma intensity, vanilla taste, chalkiness, iciness and melting rate. An organoleptic test carried out with 20 panelists. The most desirable one was the product with Sample No. 4 (8 members), Sample No. 2 (6 members), and Sample No. 3 (6 members).

EXAMPLE 8

Low-Calorie Orange Juice Drink

Orange concentrate (35%), citric acid (0.38%), ascorbic acid (0.05%), sodium benzoate (0.02%); orange red color (0.01%), orange flavor (0.20%), and a sweetener (0.06%), obtained according to the EXAMPLES 2, 3, 4, or 5 were blended and dissolved completely in water (up to 100%) and pasteurized.

The sensory evaluations of the samples are summarized in the TABLE 3. The data shows that best results can be obtained using of high purity sweeteners.

TABLE 3

| Sample | Comments | | |
|---|---|---|---|
| | Flavor | Aftertaste | Mouth feel |
| No. 1 | Sweet, rounded and balanced flavor | Slight bitterness in aftertaste | Acceptable |
| No. 2 | Sweet, rounded and balanced flavor | Almost no any bitterness | Full |
| No. 3 | High quality sweetness, pleasant, taste similar to sucrose, rounded and balanced flavor | Clean, no unpleasant bitterness and aftertaste | Quite full |
| No. 4 | High quality sweetness, pleasant, taste similar to sucrose, rounded and balanced flavor | Clean, no unpleasant bitterness and aftertaste | Quite full |

By the same way can be prepared juices from other fruits, such as apples, lemons, apricots, cherries, pineapples, etc.

EXAMPLE 9

Low-Calorie Carbonated Lemon-Flavored Beverage

The formula for the beverage was as below:

| Ingredients | Quantity, kg |
|---|---|
| Sugar | 30.0 |
| Sweetener | 0.4 |
| Citric acid | 2.5 |
| Green tea extract | 25.0 |
| Salt | 0.3 |
| Lemon tincture | 10.0 L |
| Juniper tincture | 8.0 L |
| Sodium benzoate | 0.17 |
| Carbonated water | up to 1000 L |

Sensory and physicochemical characteristics of the drink are presented in the TABLE 4.

The drinks of Samples No. 2, No. 3, and No. 4 were superior with an excellent flavor and taste.

TABLE 4

| Item | Characteristics | | | |
|---|---|---|---|---|
| | Sample No. 1 | Sample No. 2 | Sample No. 3 | Sample No. 4 |
| Appearance | Transparent liquid, free of sediment and strange impurities. A light opalescence, caused by features of used raw materials is possible. | Transparent liquid, free of sediment and strange impurities. A light opalescence, caused by features of used raw materials is possible. | Transparent liquid, free of sediment and strange impurities. A light opalescence, caused by features of used raw materials is possible. | Transparent liquid, free of sediment and strange impurities. A light opalescence, caused by features of used raw materials is possible. |
| Color | From light yellow up to yellow | From light yellow up to yellow | From light yellow up to yellow | From light yellow up to yellow |
| Taste | Sour-sweet, some bitterness in aftertaste | Sour-sweet, expression of sweetness is rapid. The taste is satisfactory. | Sour-sweet, expression of sweetness is rapid. | Sour-sweet, expression of sweetness is rapid. |
| Mass fraction of dry solids, % | | | | |
| in the fresh drink | 7.8 ± 0.2 | 7.8 ± 0.2 | 7.8 ± 0.2 | 7.8 ± 0.2 |
| after 100% inversion | 8.1 ± 0.2 | 8.1 ± 0.2 | 8.1 ± 0.2 | 8.1 ± 0.2 |
| Acidity, $cm^3$ solution of sodium hydrate, concentration of 1.0 $mol/dm^3$ per 100 $cm^3$ | 3.5 ± 0.3 | 3.5 ± 0.3 | 3.5 ± 0.3 | 3.5 ± 0.3 |

TABLE 4-continued

| | Characteristics | | | |
|---|---|---|---|---|
| Item | Sample No. 1 | Sample No. 2 | Sample No. 3 | Sample No. 4 |
| Mass fraction of carbon dioxide, % | | | | |
| high carbonated, more than | 0.40 | 0.40 | 0.40 | 0.40 |
| middle carbonated, more than | 0.30 | 0.30 | 0.30 | 0.30 |

EXAMPLE 10

Low-Calorie Carbonated Drink

The formula for the beverage was as below:

| Ingredients | Quantity, % |
|---|---|
| Cola flavor | 0.340 |
| Phosphoric acid (85%) | 0.100 |
| Sodium citrate | 0.310 |
| Sodium benzoate | 0.018 |
| Citric acid | 0.018 |
| Sweetener | 0.030 |
| Carbonated water | to 100 |

The beverages prepared with different sweeteners were given to 10 judges for comparison. TABLE 5 shows the results.

TABLE 5

| | Number of panelists | | | |
|---|---|---|---|---|
| Comparison Point | Sample No. 1 | Sample No. 2 | Sample No. 3 | Sample No. 4 |
| Bitter taste | 4 | 2 | 0 | 0 |
| Astringent taste | 4 | 3 | 0 | 0 |
| Aftertaste | 5 | 3 | 0 | 0 |
| Quality of sweet taste | Sweet with some bitterness in aftertaste (5 of the 10 judges) | Clean (7 of the 10 judges) | Clean (10 of the 10 judges) | Clean (10 of the 10 judges) |
| Overall evaluation | Satisfactory (5 of the 10 judges) | Satisfactory (8 of the 10 judges) | Satisfactory (10 of the 10 judges) | Satisfactory (10 of the 10 judges) |

The above results show that the beverages prepared using the Samples No. 2, No. 3, and No. 4 are outstanding in aftertaste and possess good organoleptic characteristics.

EXAMPLE 11

Ice Lemon Tea

The formula for the beverage was as below:

| Ingredients | Quantity, % |
|---|---|
| Sweetener | 0.08 |
| Sodium benzoate | 0.02 |
| Citric acid | 0.27 |
| Ascorbic acid | 0.01 |
| Tea extract | 0.03 |
| Lemon flavor | 0.10 |
| Water | to 100 |

All ingredients were blended and dissolved in the water, and pasteurized.

The products with all the samples possessing an excellent taste and flavor.

EXAMPLE 12

Bread 1 kg of flour, 37.38 grams of fructooligosaccharide syrup, 80 grams of margarine, 20 grams of salt, 20 grams of yeast, and 0.25 grams of sweetener, obtained according to the EXAMPLES 2, 3, 4, or 5 were placed into a blender and mixed well. 600 ml of water were poured into the mixture and kneaded sufficiently. At the completion of the kneading process, the dough has taken to be shaped and raised for 30 to 45 minutes. The ready dough was put into oven and baked for 45 minutes.

Bread samples were in creamy white in color, with a smooth texture. They displayed similar properties and taste.

EXAMPLE 13

Diet Cookie

Flour (50.0%), margarine (30.0%) fructose (10.0%), maltitol (8.0%), whole milk (1.0%), salt (0.2%), baking powder (0.15%), vanillin (0.1%) and sweetener obtained according to the EXAMPLES 2, 3, 4 or 5 (1.0%) were kneaded well in dough-mixing machine. After molding of the dough the cookies were baked at 200° C. for 15 minutes.

The product is a low-calorie diet cookie with excellent properties and appropriate sweetness.

EXAMPLE 14

Yoghurt

In 5 kg of defatted milk 4.0 grams of sweetener, prepared according to EXAMPLES 2, 3, 4 or 5, were dissolved, and after pasteurizing at 82° C. for 20 minutes, the milk was cooled to 40° C. A starter in amount of 150 grams was added and the mixture was incubated at 37° C. for 6 hours. Then, the fermented mass was maintained at 10-15° C. for 12 hours.

The product is a low-calorie and low-cariogenic yoghurt without foreign taste and odor.

EXAMPLE 15

Tablet

A mixture containing 58.5% lactose, 10% calcium silicate, 5% cross-carmellose, 5% L-leucine, 1% aerosol 200, 0.5% magnesium stearate, and 20% of a sweetener obtained according to the EXAMPLES 2, 3, 4, or 5, was kneaded sufficiently. Then the mixture was shaped with the use of a tabletting machine, equipped with punchers of 6.2 mm diameter, into tablets of 70 mg each, 3.0 mm thick, and 10±1 kg hardness The tablets can be easily administrated due to their appropriate sweetness. However, the formulations using Sample No. 1 and Sample No. 2 were somewhat sticky with a solubility of about 3-4 minutes in water at 25° C. The tablets, prepared with Sample No. 3 and No. 4, show the best characteristics with the solubility at around 20-30 seconds.

EXAMPLE 16

Toothpaste

A toothpaste was prepared by kneading a composition formulated from calcium phosphate, (45.0%), carboxymethylcellulose (1.5%), carrageenan (0.5%), glycerol (18.0%), polyoxyethylene sorbitan mono-ester (2.0%), beta-cyclodextrin (1.5%), sodium laurylsarcosinate (0.2%), flavoring (1.0%), preservative (0.1%), a sweetener obtained similarly as in EXAMPLES 2, 3, 4 or 5 (0.2%) and water to 100%, were blended in the usual way.

The product possessed excellent foaming and cleaning abilities.

It is to be understood that the foregoing descriptions and specific embodiments shown herein are merely illustrative of the best mode of the invention and the principles thereof, and that modifications and additions may be easily made by those skilled in the art without departing for the spirit and scope of the invention, which is therefore understood to be limited only by the scope of the appended claims.

We claim:

1. A sweetener comprising more than 98% of glucosylated sweet glycoside derivatives, wherein the sweetener is produced by a process of enzymatic transglucosylation from at least one sweet glycoside selected from the group consisting of stevioside, rebaudioside A, rebaudioside C, and dulcoside A;

wherein the process of enzymatic transglucosylation comprises:
dissolving starch into water to form a starch suspension;
adding a first batch of CGTase into the starch suspension and incubating for 0.5 to 2 hours at 75-80° C., resulting in the liquefaction of starch;
adding a purified *Stevia* extract comprising stevioside, rebaudioside A, rebaudioside C, and/or dulcoside A into the liquefied starch suspension, resulting in a reaction mixture; wherein the added *Stevia* extract is about equal to that of the starch;
adding a second batch of CGTase into the reaction mixture and incubating for 12 to 48 hours at 55-75° C.;
adding sucrose into the reaction mixture and incubating for 2 to 10 hours at 65-75° C. to form fructose-terminated oligosaccharides;
removing malto- or fructose-terminated oligosaccharides; and
concentrating and drying to obtain the sweetener with more than 98% of the glucosylated sweet glycoside derivatives;
wherein the sweetener is with the most superior sweetness quality and more than 170 times of relative sweetness to 5% of sucrose.

2. The sweetener of claim 1, wherein the COTase is produced by cultures of *Bacillus stearothemophilus*.

3. The sweetener of claim 1, wherein the process further comprises decolorizing and desalting.

4. The sweetener of claim 3, wherein the decolorizing is performed using activated carbon.

5. The sweetener of claim 3, wherein the desalting is performed by passing through ion exchange resin.

6. The sweetener of claim 1, wherein the process further comprises removing malto- or fructose-terminated oligosaccharides through a column packed with Amberlite XAD16 HP, wherein the column is washed sequentially with water and ethanol with increased concentration; thereby monosaccharides and oligosaccharides are in the fractions of the water and low concentration of ethanol, and glycosylated and non-modified glycosides are in the fractions of high concentrations of ethanol.

* * * * *

UNITED STATES PATENT AND TRADEMARK OFFICE
CERTIFICATE OF CORRECTION

PATENT NO. : 8,318,232 B2
APPLICATION NO. : 12/684129
DATED : November 27, 2012
INVENTOR(S) : Varuzhan Abelyan, Avetik Markosyan and Lidia Abelyan It is certified that error appears in the above-identified patent and that said Letters Patent is hereby corrected as shown below:

In the Claims

Claim 2    (Column 16, Line 28),    "COTase" should be "CGTase"

Signed and Sealed this
Twenty-fifth Day of February, 2014

Michelle K. Lee
*Deputy Director of the United States Patent and Trademark Office*